United States Patent [19]

Nielsen et al.

[11] Patent Number: 5,287,365
[45] Date of Patent: Feb. 15, 1994

[54] COMPACT LASER APPARATUS

[75] Inventors: Edward G. Nielsen; Willard G. Vogelaar, both of Grand Rapids; Philip O. Gerard, Lowell, all of Mich.

[73] Assignee: Laser Alignment, Inc., Grand Rapids, Mich.

[21] Appl. No.: 847,772

[22] Filed: Mar. 5, 1992

[51] Int. Cl.$^5$ .............................................. H01S 3/10
[52] U.S. Cl. ........................................ 372/9; 372/107; 372/99
[58] Field of Search .................... 372/92, 107, 9, 93, 372/99, 108, 109, 65

[56] References Cited

U.S. PATENT DOCUMENTS

| | | | |
|---|---|---|---|
| B1 4,221,483 | 8/1991 | Rando | 356/250 |
| 3,469,919 | 8/1969 | Zellner | 356/4 |
| 3,471,234 | 10/1969 | Studebaker | 356/3 |
| 3,588,255 | 6/1971 | Alexander | 356/153 |
| 3,603,691 | 9/1971 | Hamilton | 356/152 |
| 3,771,876 | 11/1973 | Ljungdahl et al. | 356/138 |
| 3,775,929 | 12/1973 | Roodvoets et al. | 52/747 |
| 3,822,943 | 7/1974 | Mason | 356/138 |
| 3,856,409 | 12/1974 | Cindrich et al. | 356/138 |
| 3,897,637 | 8/1975 | Genho | 33/227 |
| 3,902,810 | 9/1975 | Hamar | 356/138 |
| 3,907,436 | 9/1975 | Wolga | 356/153 |
| 3,936,197 | 2/1976 | Aldrink et al. | 356/250 |
| 3,966,328 | 6/1976 | Wiklund | 356/138 |
| 4,062,634 | 12/1977 | Rando et al. | 356/248 |
| 4,221,483 | 9/1980 | Rando | 356/250 |
| 4,252,439 | 2/1981 | Drozella | 356/153 |
| 4,293,218 | 10/1981 | Nielsen et al. | 356/138 |
| 4,333,242 | 6/1982 | Genho, Sr. | 33/227 |
| 4,423,957 | 1/1984 | Poole | 356/153 |
| 4,441,818 | 4/1984 | Wickman | 356/372 |
| 4,502,783 | 3/1985 | Lau et al. | 356/152 |
| 4,632,553 | 12/1986 | Vidrine et al. | 356/346 |
| 4,674,097 | 6/1987 | Fountain | 372/107 |
| 4,676,598 | 1/1987 | Markley et al. | 350/171 |
| 4,770,480 | 9/1988 | Teach | 350/6.5 |
| 4,836,669 | 6/1989 | Teach | 356/618 |
| 4,852,265 | 8/1989 | Rando et al. | 33/227 |
| 4,912,851 | 4/1990 | Rando et al. | 33/227 |
| 4,971,440 | 11/1990 | Winckler et al. | 356/138 |
| 4,973,158 | 11/1990 | Marsh | 356/247 |
| 5,011,265 | 4/1991 | Tamamura et al. | 350/173 |
| 5,142,788 | 9/1992 | Willets | |
| 5,144,486 | 9/1992 | Hart | |
| 5,144,487 | 9/1992 | Hersey | |
| 5,144,638 | 9/1992 | Danin | 372/107 |

Primary Examiner—Leon Scott, Jr.
Attorney, Agent, or Firm—Price, Heneveld, Cooper, DeWitt & Litton

[57] ABSTRACT

A compact laser construction instrument intended for use by the average construction contractor. The instrument is capable of generating a rotating plane of laser light and a beam of light that is perpendicular to the rotating plane. It includes a beam generator adapted to generate a beam of collimated light along a given axis. A rotating platform is provided for supporting the beam generator for rotation in a plane parallel the axis of the collimated light and about a rotation axis that is perpendicular to the axis of the collimated light in order to generate a plane of light. A means is provided that is positioned for rotation with the platform for generating a second beam of collimated light along the rotation axis to generate a rotating narrow beam of light that is perpendicular to the plane.

29 Claims, 8 Drawing Sheets

COMPACT LASER APPARATUS

BACKGROUND OF THE INVENTION

This invention relates generally to a laser apparatus and more particularly to a compact laser construction instrument that is adapted to home-construction use.

It is known to provide a laser construction instrument that generates a rotating plane of laser light for surveying purpose as well as for guiding excavators, road graders and the like. Such instruments are capable of generating a laser plane that is accurate to 1/16 of an inch per 100 foot of distance. Such accuracy comes at a price and typically requires complex optical systems and a self-leveling mechanism. While the expense is justified for large scale construction usage, it becomes prohibitive for casual users, particularly for home builders and home owners. While it is known to utilize such a construction laser plane generator for laying out the grid of a suspended ceiling, the known laser plane generators are beyond the price point of all but the professional ceiling contractors.

The known laser plane generator generates a collimated beam of light in a vertical axis, which is deflected by a rotating deflection device into a horizontal plane that rotates using a rotating penta-prism or penta-reflector. It has been discovered that enhanced performance may be obtained by using a rotating penta-prism or penta-reflector that reflects only a portion of the vertical beam into the horizontal while providing a beam which passes through the penta-prism or penta-reflector in the vertical axis. This provides a beam of light that is perpendicular to the generated light plane. This can be used for setting walls and foundations and the like at true right angles. The difficulty with such known devices is that both the penta-prism and penta-reflector impose a lateral offset to the vertical axis beam, requiring compensation. If such compensation were not provided, a rotating cylinder, rather than a rotating beam, would be provided. Such compensation adds additional expense to an already costly device. The penta-prism and penta-reflectors are precision optic devices costing several hundreds of dollars a piece.

SUMMARY OF THE INVENTION

The present invention provides a compact laser construction instrument that is intended for use by the average construction contractor. The present invention provides a compact laser construction instrument that not only is reliable and inexpensive but is capable of superior performance. The present invention provides a construction instrument that is capable of generating a rotating plane of laser light and a beam of light that is perpendicular to the rotating plane. It includes a beam generator that is adapted to generating a beam of collimated light along a given axis. A rotating platform is provided for supporting the beam generator for rotation in a plane parallel the axis of the collimated light and about a rotation axis that is perpendicular to the axis of the collimated light in order to generate a plane of light. A means is provided that is positioned for rotation with the platform for generating a second beam of collimated light along the rotation axis to generate a rotating narrow beam of light that is perpendicular to the plane.

In one embodiment of the invention, the second beam of collimated light is generated by providing a second beam generator that is positioned to generate the second beam of collimated light along the axis of rotation. This is accomplished in a detailed embodiment by rotating the platform with a shaft and positioning the second beam generator within a cavity formed in the shaft. In another embodiment of the invention, the second beam of collimated light is generated by a partially reflective light transmission device, or partial reflectance element, that is positioned on the platform at the axis of rotation in order to reflect a portion of the first beam of light along the axis of rotation. This is accomplished in a detailed embodiment by providing the partial reflective transmission device as a first-surface-reflecting beam splitter, which is capable of generating a rotating narrow beam of collimated light without special compensation.

Because the second beam of collimated light is a rotating narrow beam of light, the proper functioning of the instrument may be readily verified by observing the image of the beam projecting on a surface. Proper alignment is verified by a stationary dot of small diameter If the instrument is misaligned, the beam will project a much larger image of pulsating intensity According to another aspect of the invention a first positioning element is provided for adjustably positioning a first beam generator on the rotating platform. The positioning element provides one degree-of-freedom of adjustment for the beam generator to ensure that the instrument generates a flat plane. This may be accomplished by providing an elongated crevice on either the platform or the positioning element with a bead, configured to mateably engage the crevice, on the other one of the platform and the element. An adjustment means is provided that is spaced from the crevice in order to rotate the positioning element about the crevice A second positioning element is provided for adjustably positioning a partial reflectance element on the platform. The second positioning element provides two orthogonal degrees-of-freedom so that the reflective surface may be precisely adjusted with respect to the first beam of light. In a preferred embodiment, the second positioning element is supported by the first positioning element.

According to yet a further aspect of the invention, a compact laser construction instrument includes an enclosure having first and second detached housing portions. A shaft is provided that is rotatably mounted within the first housing portion and a motor is attached in the first housing portion An opening is defined in the first housing portion, aligned with the shaft The second housing portion includes a skirt portion extending into the opening around the shaft. A light generator is mounted to the shaft in the second housing portion and adapted to rotate therewith. This arrangement provides a rugged construction that resists the entry of objects into the opening Furthermore, the motor may be coupled with the skirt portion extending into the first housing portion to rotate the light generator. This may be accomplished by a drive belt extending in an annular channel formed in the skirt portion.

These and other objects, advantages and features of this invention will become apparent upon review of the following specification in conjunction with the drawings.

DESCRIPTION OF THE PREFERRED EMBODIMENT

Figure 3:
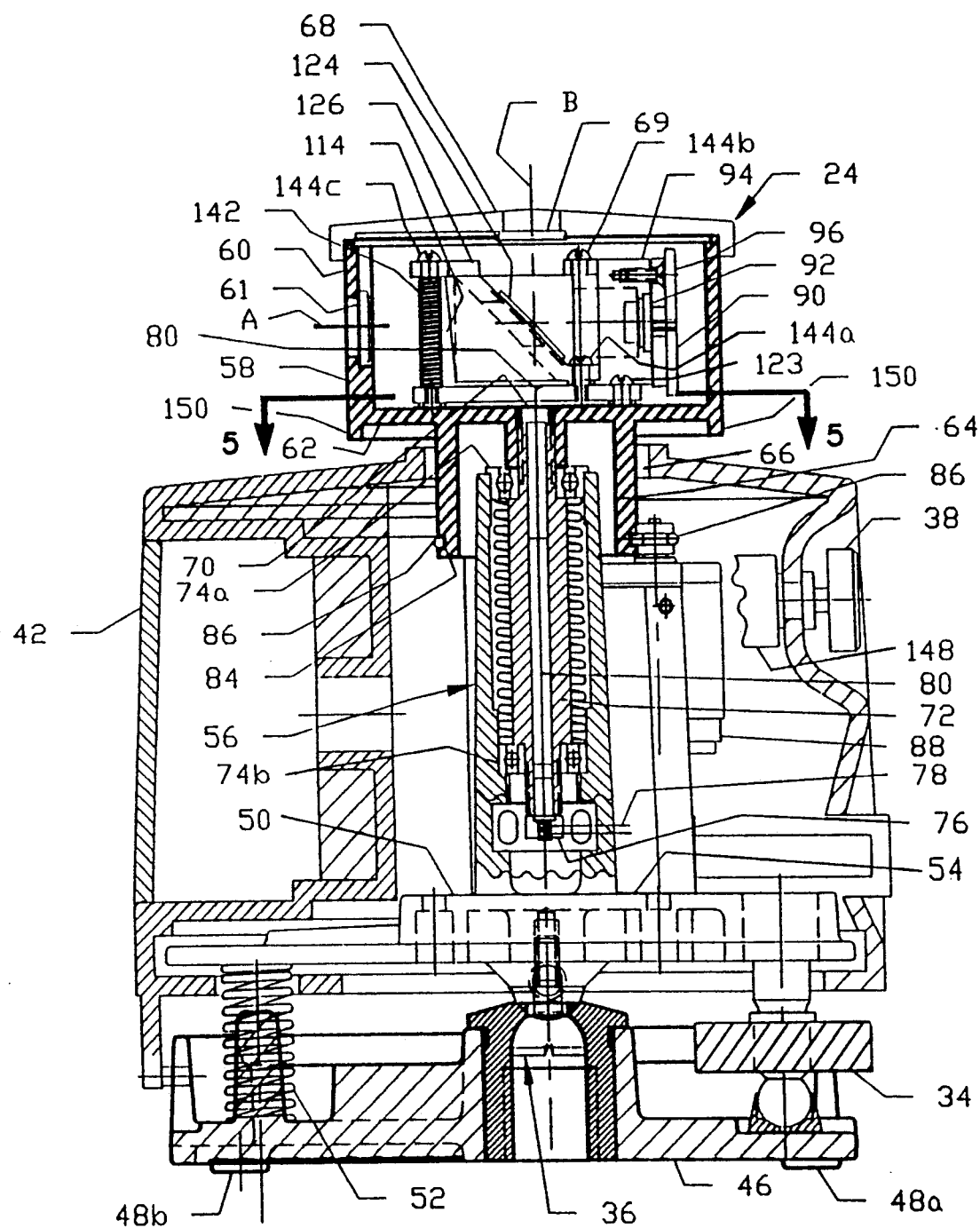
FIG. 3 is a sectional view taken along the lines III—III in FIG. 2.

Referring now specifically to the drawings, and the illustrative embodiments depicted therein, a compact laser construction instrument 20 includes a stationary base 22 and a rotating head 24. Base 22 includes a housing 26, a first level indicating vial 28 and a second level indicating vial 30 at right angle to vial 28. A third level indicating vial (not shown) may be provided at a right angle to vials 28, 30 to enable instrument 20 to be positioned on its side. A manual rotatable leveling jack 32 provides manual leveling of housing 26 about an axis indicated by leveling vial 28 and a leveling jack 34 provides leveling of housing 26 about an axis indicated by leveling vial 30. Leveling jacks 32 and 34 rotate housing 26 about a pivot support 36 (FIG. 3).

Figure 1:
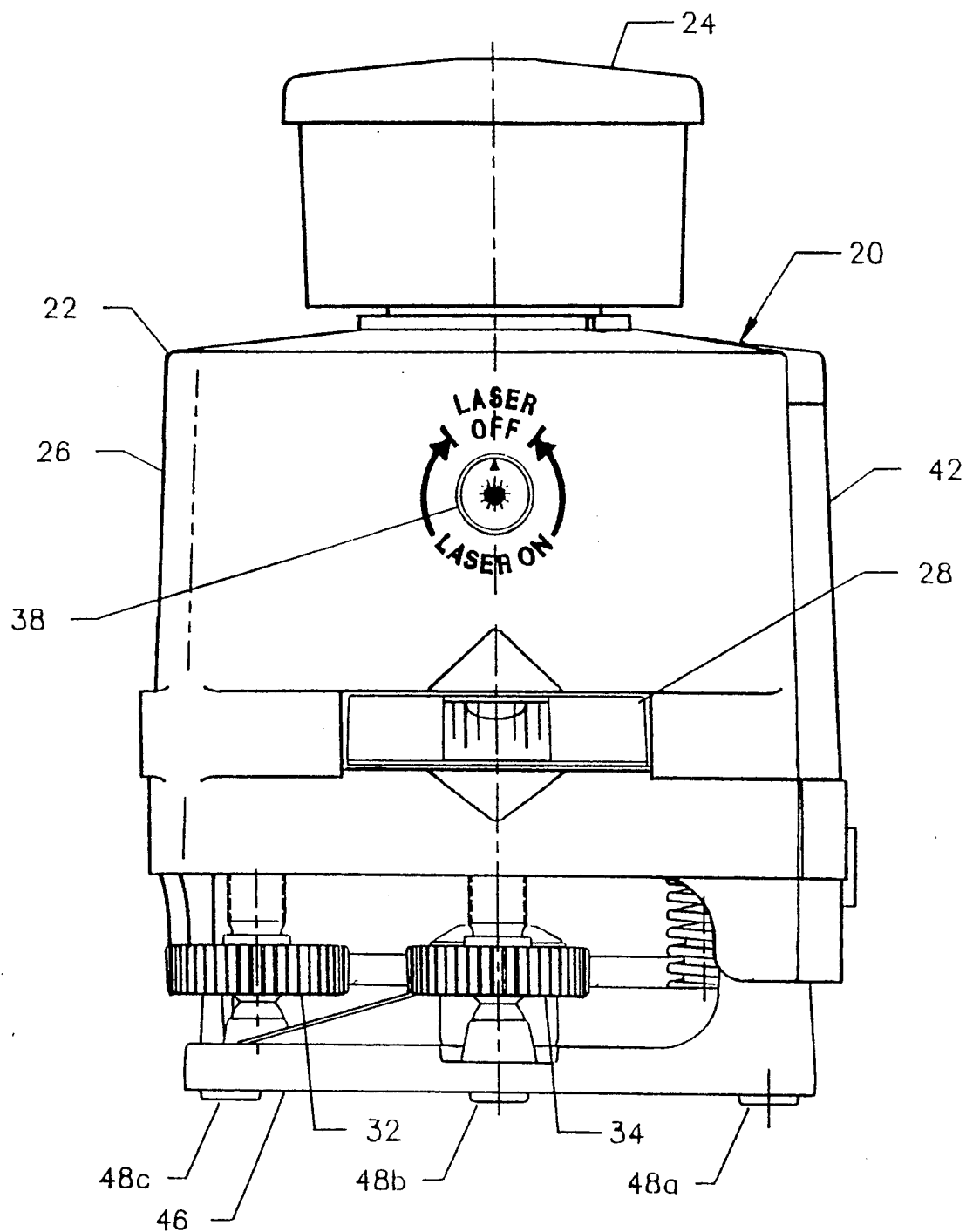
FIG. 1 is a side elevation of a construction instrument according to the invention.
Figure 2:
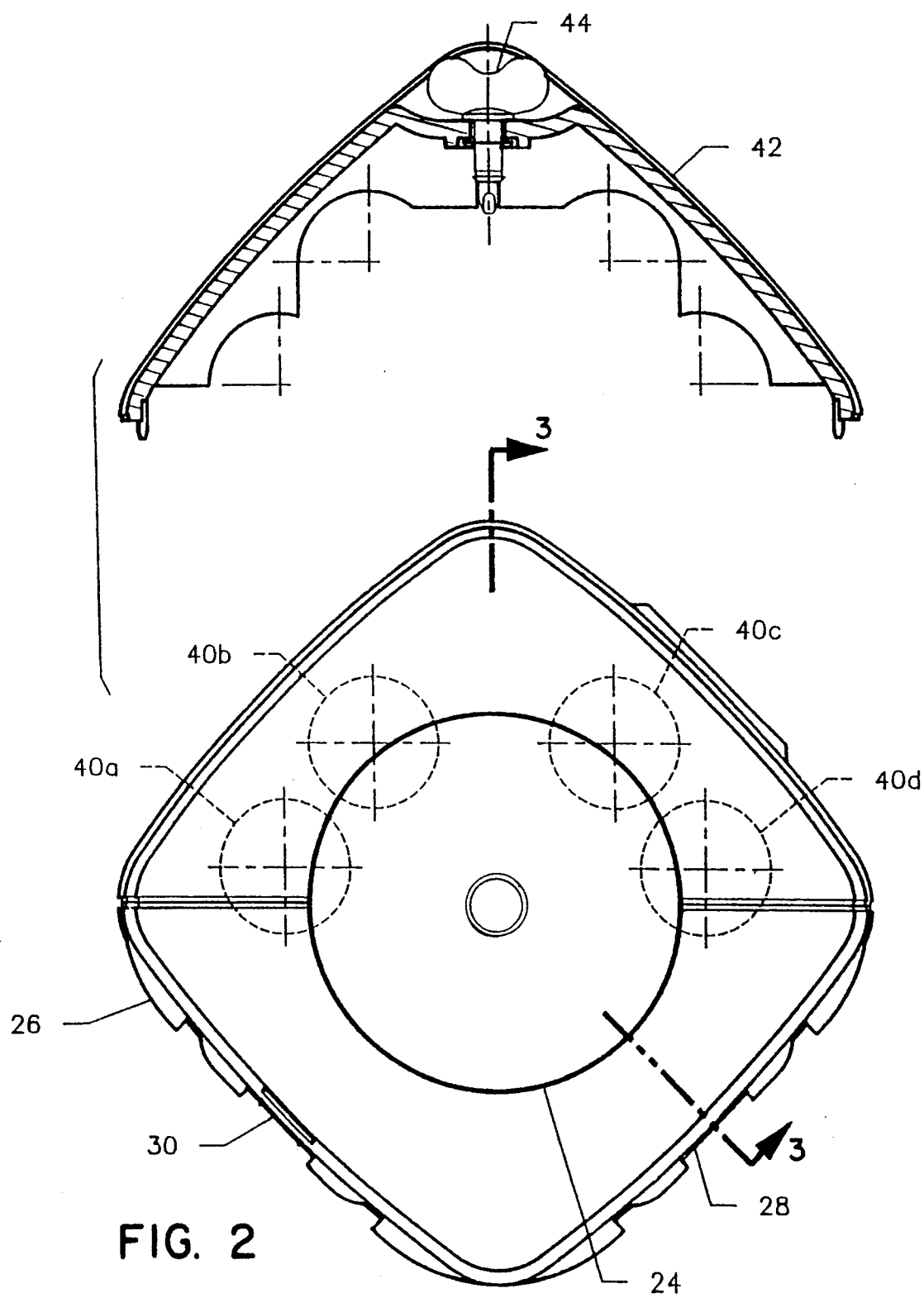
FIG. 2 is a plan view of the construction instrument in FIG. 1 with a portion of the housing separated from the remainder of the housing

Base 22 further includes a speed adjustment 38 which provides an on/off control for the instrument as well as control of the speed of rotation of head 24. Construction instrument 20 is compact and battery operated from commercially available batteries designated 40a, 40b, 40c and 40d (FIG. 2). Housing 26 includes a removable portion 42, which is removably retained by a thumb lock 44 in order to provide access to batteries 40a-40d for replacement. A base plate 46 includes a plurality of feet 48a, 48b and 48c for engaging a horizontal surface (FIG. 3). A frame 50 is pivotally supported about base plate 46 by pivot support 36 and is positioned by leveling jacks 32 and 34. A compression spring 52 balances the forces exerted by the leveling jacks 32, 34. Frame 50 includes a generally horizontal support portion 54 and a vertically extending post 56. Support portion 54 is integral with and supports post 56 and is engaged by leveling jacks 32, 34, spring 52 and pivot support 36.

Head 24 includes a housing 58 having an annular wall portion 60 and a support portion 62 Housing 58 additionally includes an annular skirt portion 64 extending from support portion 62 into an opening 66 defined within an upper portion of housing 26. A removable cap 68 engages an upper edge of annular wall 60 to enclose housing 58. Support portion 62 of housing 58 includes a central opening 70 which is aligned with a downwardly extending hollow shaft 72. Shaft 72 is rotatably supported by a pair of ball bearings 74a, 74b positioned between opposite portions of shaft 72 and post 56. A slip ring 76 provides electrical interconnection between stationary electrical leads 78 and rotatable electrical leads 80 extending through central opening 82 defined in shaft 72.

Figure 6:
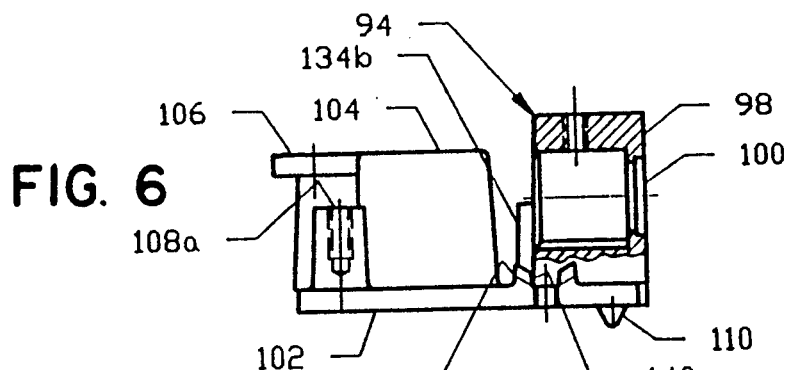
FIG. 6 is an elevation of a laser positioning bracket according to the invention.
Figure 7:
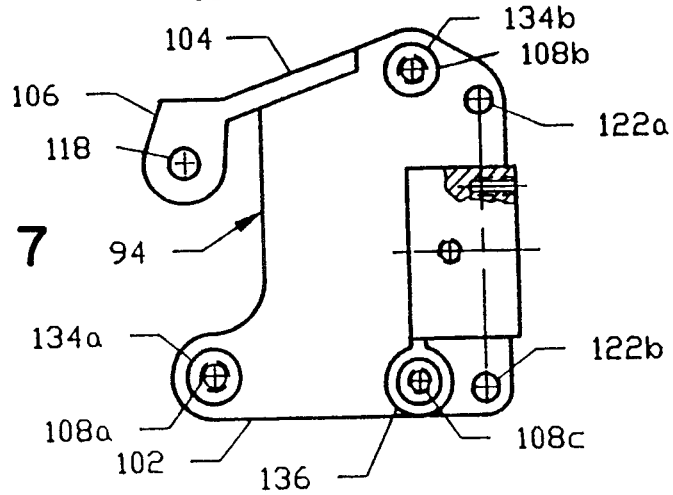
FIG. 7 is a plan view of the bracket in FIG. 6.
Figure 8:
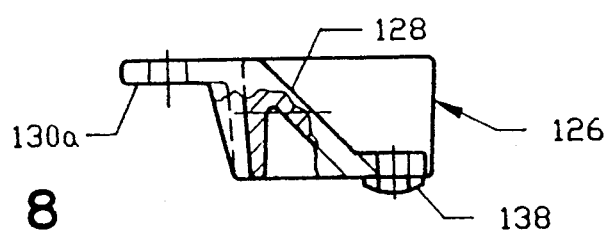
FIG. 8 is an elevation of a reflectance element positioning bracket according to the invention.
Figure 9:
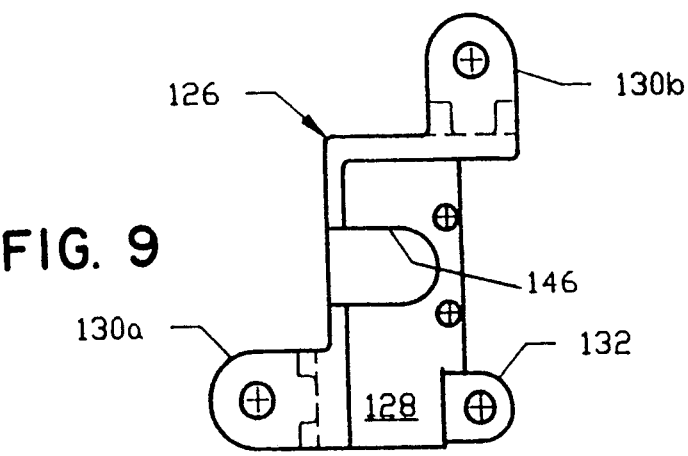
FIG. 9 is a plan view of the bracket in FIG. 8.

An annular channel 84 is defined in skirt portion 64 and is engaged by a drive belt, such as an o-ring 86, that is driven by a DC motor 88 mounted to frame 50. This rotates head 24 about shaft 72 within post 56. Rotatable electrical leads 80 supply electrical energy to a beam generator 90 which includes a laser diode 92 supported on a diode support bracket 94 Laser diode 92 incorporates a collimating lens in order to generate a narrow beam of collimated light along an axis generally indicated as A. Laser diode 92 is mounted to a circuit board 96 which is, in turn, attached to a frame 98 surrounding a diode-receiving opening 100 (FIG. 6). Diode support bracket 94 additionally includes a base 102 which supports frame 98 and an arm 104 extending upwardly and away from base 102. Arm 104 supports a pad 106 vertically spaced from base 102 and horizontally spaced from frame 98 Threaded openings 108a and 108b are formed in a pair of support posts 134a and 134b extending upwardly from base 102. A threaded opening 108c is formed in a support pad 136 extending upwardly from base 102.

Figure 5:
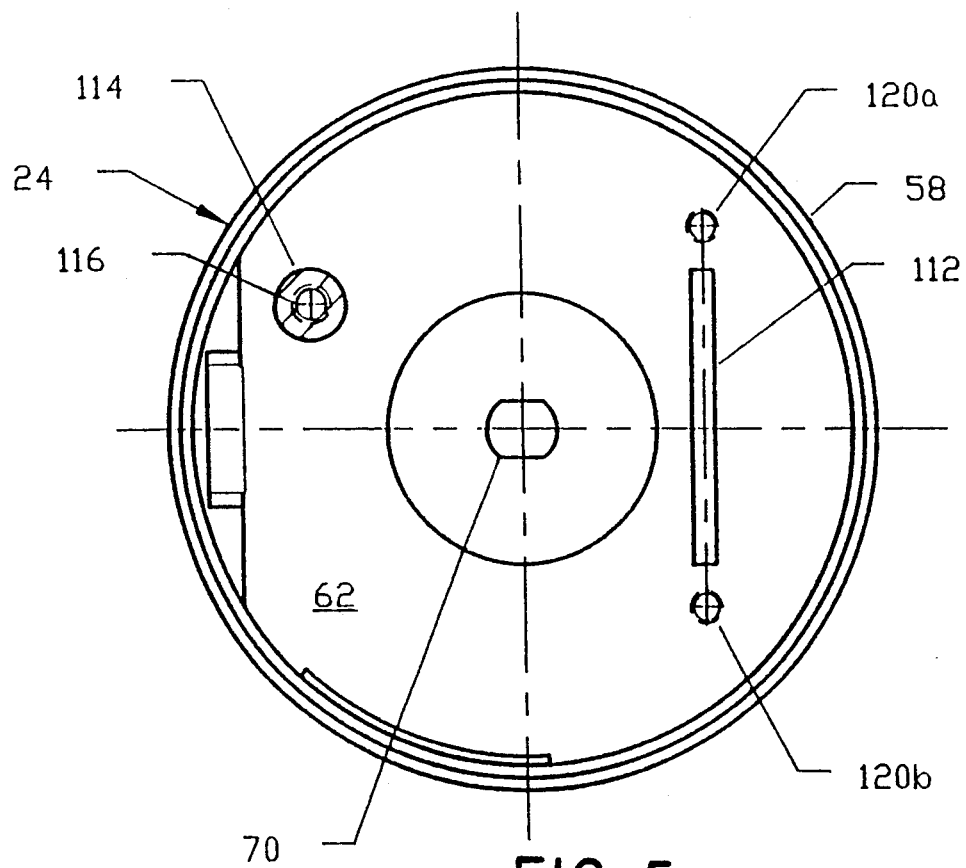
FIG. 5 is a sectional view taken along the lines V—V in FIG. 3.

Diode support bracket 94 additionally includes an elongated bead 110 extending downwardly from base 102 and configured to mateably interface with a crevice 112 defined in support portion 62 in housing 58 (FIGS. 5 and 6). A support post 114 extends upwardly from support portion 62 and includes a threaded opening 116 for receiving a fastener (not shown) passing through an opening 118 in pad 106. With elongated bead 110 positioned within crevice 112 and a compression spring (not shown) between pad 106 and support post 114, the horizontal orientation of laser diode 92 can be adjustably positioned by rotating the fastener (not shown) extending into opening 116 in support post 114. A pair of threaded openings 120a, 120b positioned at opposite ends at crevice 112 threadably receive fasteners 123 extending through openings 122a and 122b in base 102. Diode support bracket 94 is locked in place after the mechanical calibration, described above, has been performed by the placement of a locking fluid on the fasteners.

The narrow beam of collimated light 156 generated by diode 92 along axis A intersect a partial reflectance element 124 supported by a reflectance element support bracket 126. Partial reflectance element 124 is positioned in order to reflect a portion of the narrow beam of collimated light generated by diode 92 perpendicular along an axis B through a dust lens 69 positioned in an opening in cap 68. The portion of the narrow beam of collimated light generated by laser diode 92 that is transmitted through partial reflectance element 124, without reflection, exits housing 58 through a dust lens 61 positioned within an opening in annular wall 60.

Reflectance element support bracket 126 includes a support surface 128 to which partial reflectance element 124 is attached by a suitable adhesive or the like. An opening 146 is defined in support surface 128 to pass the beam of collimated light that is not reflected by partial reflectance element 124. Reflectance element support bracket 126 additionally includes a pair of upper pads 130a, 130b and a lower pad 132. Upper pads 130a, 130b are positioned over support posts 134a, 134b, extending upwardly from base 102 of diode support bracket 94. Lower pad 132 is positioned over support pad 136, extending slightly upwardly from base 102. Lower pad 132 includes a rounded downwardly extending surface 138 for engaging a depression 140 in support pad 136. Compression springs 142 (only one of which is shown) separate upper pads 130a, 130b from support post 134a, 134b. With fasteners 144a, 144b, 144c extending, respectively, between lower pad 132 and support pad 136, and between upper pads 130a, 130b and support post 134a, 134b, reflective element support bracket 126 may be adjusted in two degrees-of-freedom by pivoting of surface 138 in depression 140. Thus, rotation of fastener 144b adjusts one degree-of-freedom of partial reflectance element 124 and rotation of fastener 144c adjusts an orthogonal degree-of-freedom of partial reflectance element 124. When partial reflectance element 124 has been properly aligned, a locking fluid is placed on the fasteners to lock the partial reflectance element in place.

Speed adjustment device 38 includes a combination rheostat and switch 148 which applies no power to motor 88 or to diode 92 as long as speed adjust 38 is in the off position. When speed adjust 38 is rotated to an operational position, full battery voltage is applied to diode 92 through electrical leads 78, slip rings 76 and rotatable leads 80. A variable DC voltage is supplied to DC motor 88 to adjust the speed of the motor. In this manner, the speed at which motor 88 rotates head 24 is adjustable. As head 24 rotates, the beam of collimated light generated along axis A generates a plane of light. The portion of the beam of light generated by diode 92, and reflected by partial reflectance element 124 along axis B, extends through lens 69 perpendicular from the rotating plane of light along axis A. If the diode 92 and partial reflectance element 124 are properly aligned, the beam of collimated light generated along axis B will remain collimated in a narrow beam. This will be readily verified by the user by projecting the beam generated along axis B against a surface If alignment is proper, a small constant intensity circle will be projected. If not, the circle will be larger and pulsating.

Figure 4:
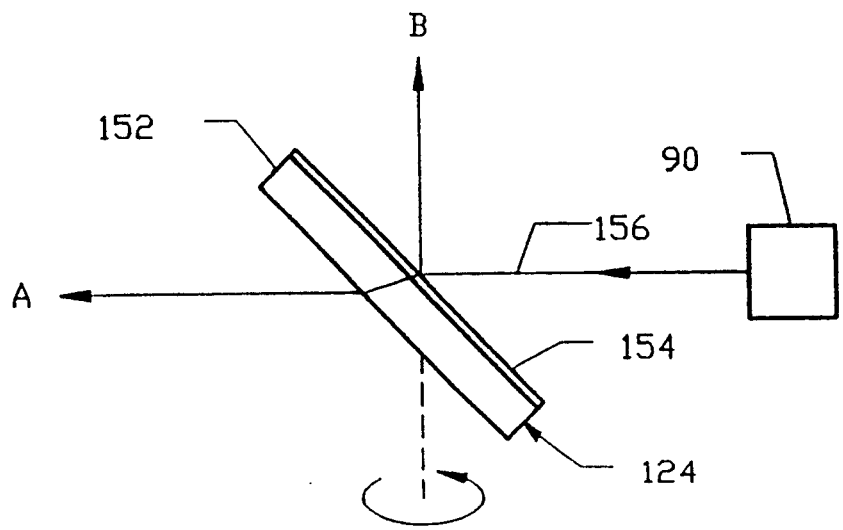
FIG. 4 is an enlarged view of a portion of the instrument as viewed in FIG. 3 in order to illustrate a principle of operation.

Partial reflectance element 124 is a first-surface-reflecting beam splitter including a substrate 152 and a reflectance surface 154 (FIG. 4). The beam of collimated light generated by beam generator 90, indicated at 156, is reflected by reflecting surface 154 without traversing substrate 152. As a result, there is no refraction tending to distort the path of light along axis B. As a result, with partial reflectance element 124 rotating about axis B, beam 156 is reflected at a true right angle along axis B without a tendency to distort the beam into a cylinder or cone. Although the portion of beam 156 transmitted along axis A is refracted by substrate 152, this merely offsets the beam 156 but does not distort the perpendicular relationship of the beam to the axis of rotation. Accordingly, with partial reflective element 124 rotated about axis B, a true plane of light is generated coincident with axis A and perpendicular with axis B. In the illustrative embodiment, partial reflectance element 124 is a beam splitter having a transmission parameter of approximately between 75 and 81 per cent and a reflection parameter of approximately between 19 and 25 per cent, with a 10 per cent maximum absorption. This ratio is advantageous because the light projected along axis A requires greater intensity because it strikes any one surface portion momentarily in response to the rotation of head 24 while the beam generator long axis B is continuous. Such characteristics may be provided by depositing a film of magnesium fluoride on a common substrate 152, such as borosilicate glass. However, other coatings and substrates would be apparent to the skilled artisan.

In the illustrated embodiment laser diode 92 generates light in the visible spectrum. This advantageously generates a visible plane of light along axis A and a visible narrow beam of collimated light along axis B. This allows compact laser construction instrument 20 to be utilized within the relatively confined area of a structure without the necessity of special light sensing receiver instruments. This is advantageous because such additional receiver adds expense to the instrument and provides further complexity for the user. If, however, it is desired to operate construction instrument 20 in a bright ambient light environment, such as outdoors, then its performance may be extended to even such high ambient light conditions by utilizing a laser light receiver of the type disclosed in U.S. Pat. No. 3,819,273, the disclosure which is hereby incorporated herein by reference.

A laser diode capable of generating a collimated beam of light in the visible spectrum is commercially available and is marketed by Toshiba Corporation under model number TQLD9410. Motor 88 is a 3 watt DC motor that is capable of operation from zero to six Volts DC. Such motors are commercially available and marketed by Maxon under model number 2322 833-11.112. The rotating speed of head 24 varies between 0-6 revolutions per second.

The projection of skirt portion 64 into housing 26 serves to keep debris from entering opening 66 in housing 26 (FIG. 3). This effect may be beneficially improved by providing a overhang portion 150 projecting from annular wall 60 toward housing 26 In the illustrated embodiment, skirt portion 64 is projected within housing 26 to a location between bearings 74a and 74b. With annular grove 84 also positioned between bearings 74a and 74b, motor 88 applies the torque to rotate head 24 in a manner that tends to reduce the stress and vibrational forces created by the rotation of head 24.

Figure 10:
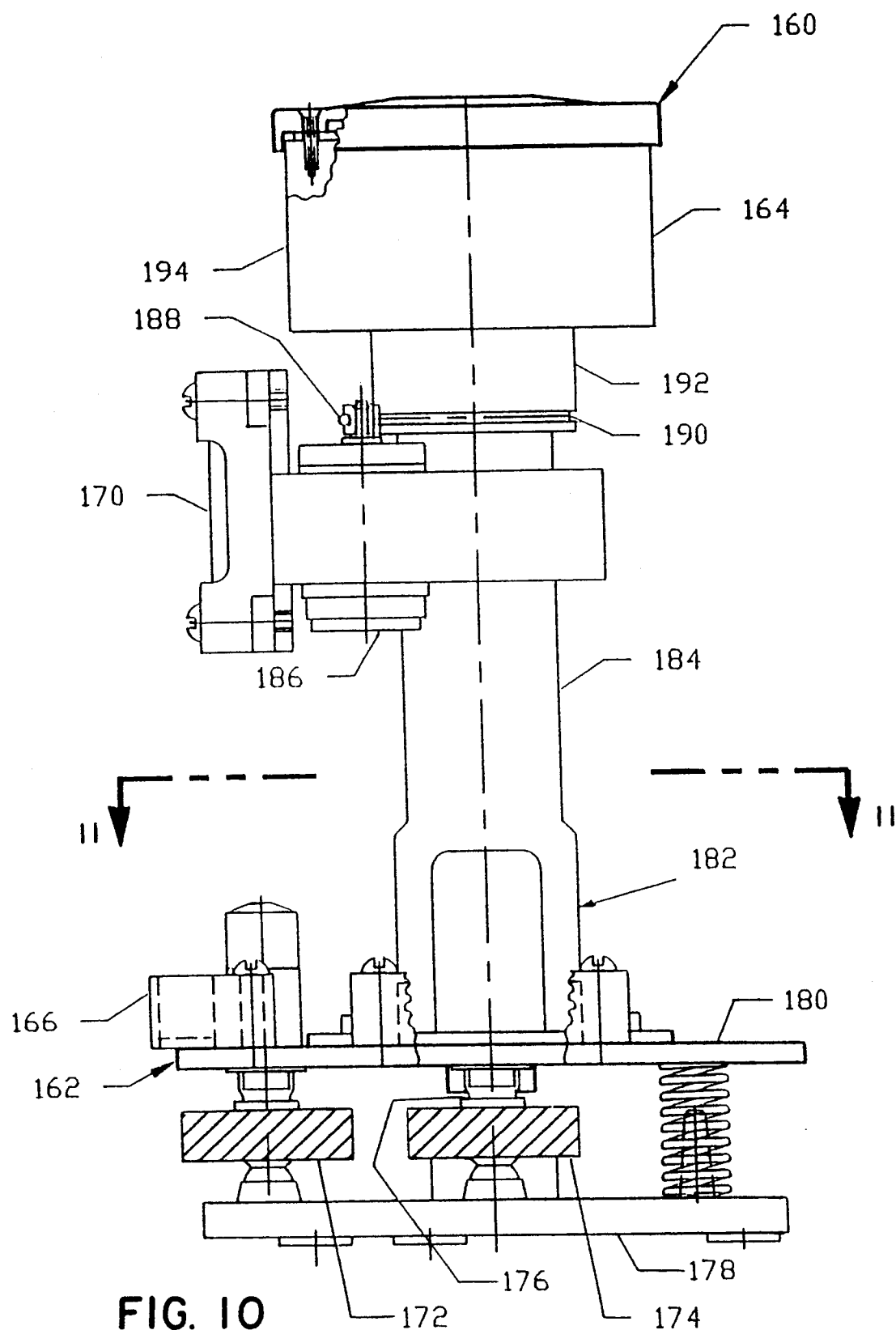
FIG. 10 is a side elevation of an alternative embodiment of the invention.
Figure 11:
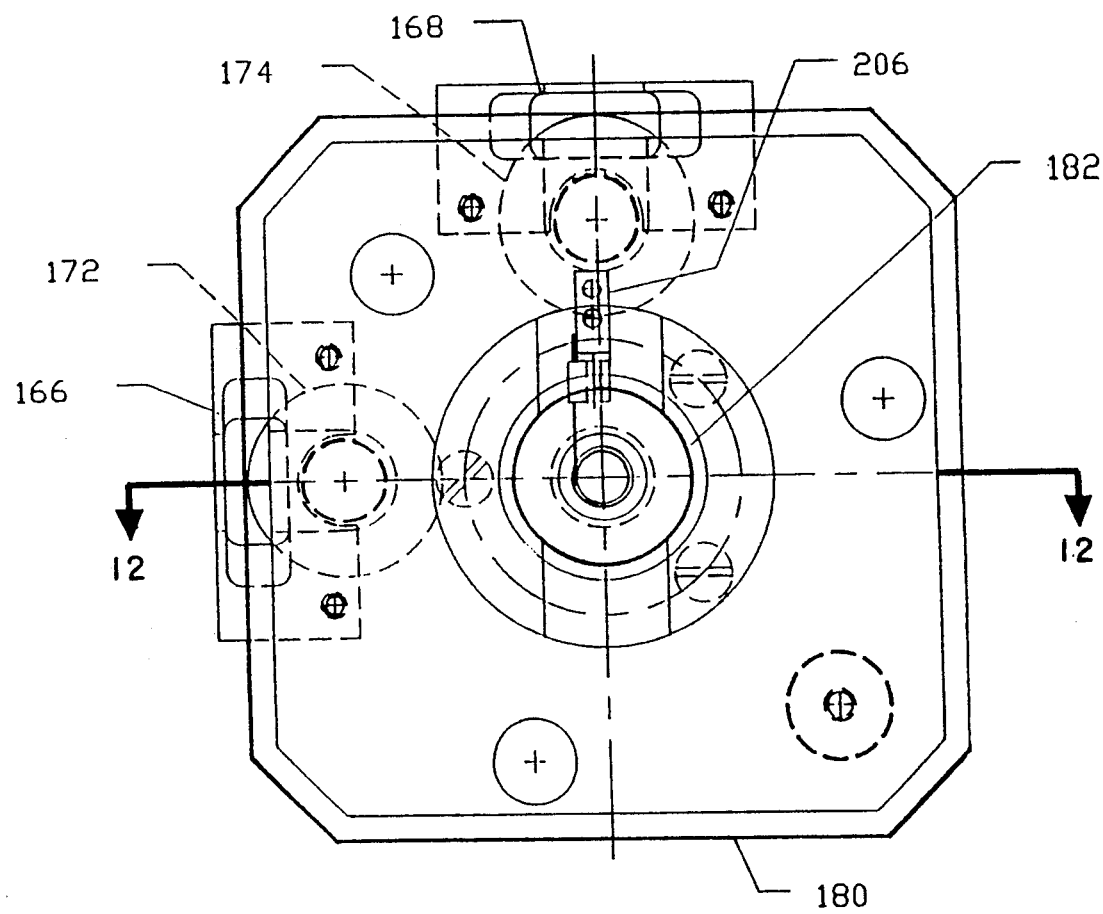
FIG. 11 is a sectional view taken along the lines XI—XI in FIG. 10.
Figure 12:
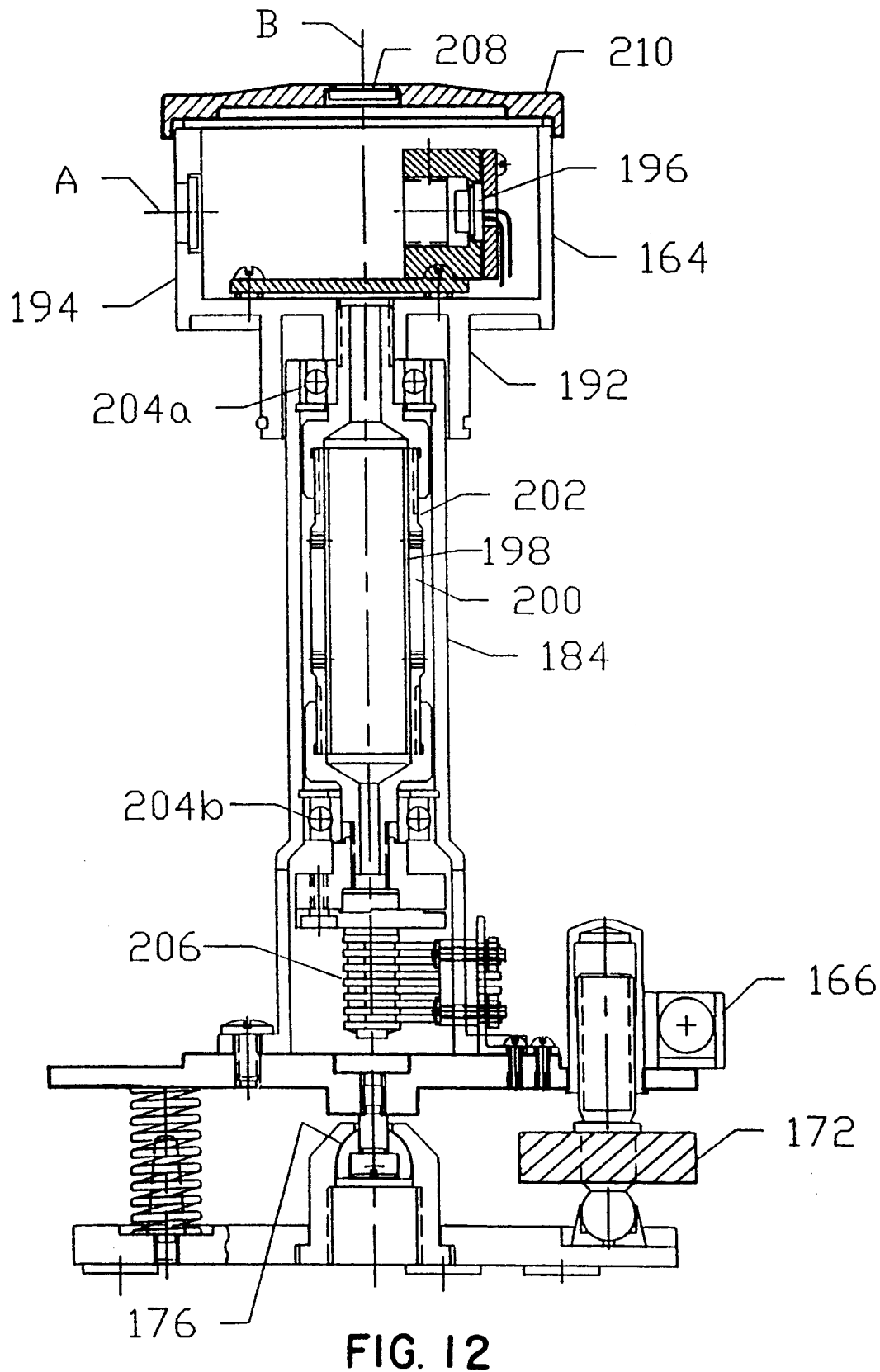
FIG. 12 is a sectional view taken along the lines XII—XII in FIG. 11.

An alternative compact laser construction instrument, generally designated 160, includes a base 162 and a rotating head 164 (FIG. 10–12). Construction instrument 160 further includes a housing surrounding base 162, which has been eliminated from the drawings for the purposes of highlighting the interior components thereof. Construction instrument 160 includes level indicating vials 166 and 168, to indicate a level inclination of construction instrument 160 in the two degrees of freedom of a horizontal plane. Additionally, a third level indicating vial 170 may be provided in order to indicate a level inclination of construction instrument 160 when laid on its side for the purposes of generating a vertical plane of light by the rotation of head 164. Construction instrument 160 includes a pair of leveling jacks 172, 174 for leveling instrument 160 about a pivot support 176. Leveling jacks 172, 176 operate between a base plate 178 and a support portion 180 of a frame 182. Frame 182 includes a post 184 extending vertically upwardly from support portion 180. A DC motor 186 is mounted to post 184 and rotates head 164 through a drive belt 188 engaging an annular grove 190 in a skirt portion 192 of housing 194 enclosing head 164.

A first beam generator 196 is mounted within head 164 to rotate with the head and transmit a collimated beam of light along axis A (FIG. 12). A second beam generator 198 is positioned within a cavity 200 defined within a shaft 202. Shaft 202, in turn, rotates in bearings 204a, 204b positioned between the shaft and post 184. In this manner, second beam generator 198 rotates in unison with head 164. A slip ring 206 provides electrical interconnections with rotating shaft 202 in order to provide electrical energy to beam generators 196 and 198. Beam generator 198 is oriented to generate a narrow beam of collimated light along axis B through dust lens 208 mounted within cap 210 of housing 194. In the illustrated embodiment, second beam generator 198 includes a laser diode and collimating lens of the type that are commercially available. Both beam generators 196 and 198 preferably generate narrow beams of light in the visible spectrum.

Compact laser construction instrument 160 provides a rotating narrow beam of light along axis B. This allows the user to verify that the instrument is properly operating by projecting the beam along axis B onto a surface and observing the pattern. If a small, constant spot is observed, then alignment is proper. If the pattern is of a larger circle with fluctuating intensity, then alignment is improper. Construction instrument 160 is capable of generating a more intense rotating plane of visible light and a perpendicular narrow beam of light, because the plane and perpendicular beam are separately generated by individual beam generators. This is in contrast with construction instrument 20 in which the beam perpendicular to the plane is generated by reflecting a portion of the beam generated from a single beam generator. However, the structure and cost of construction instrument 20 provides an advantage where the intensity of the generated light plane and narrow beam are not required.

The structure provided by the present invention is extremely durable as a result of the unique inter-relationship of the housings of the rotating head and the stationary housing as well as the transmission of torque from the motor to the rotating platform. Furthermore, the particular alignment structure for the beam generator and partial reflectance element (if used) is readily accessible, both for factory use and subsequent field service. Because the invention provides a rotating laser plane as well as a perpendicular narrow beam of rotating light, the invention provides an instrument that is extremely versatile for application to various do-it-yourself and professional usage. The invention is useful for residential and commercial building contractors and even home owners.

Furthermore, the user is provided with a capability to verify the proper alignment of the instrument. Importantly, all of these beneficial features are provided in an instrument that avoids complicated optical paths, including the necessity for compensation, required by prior art prisms and reflection elements.

Changes and modifications in the specifically described embodiments can be carried out without departing from the principles of the invention, which is intended to be limited only by the scope of the appended claims, as interpreted according to the principals of patent law including the doctrine of equivalence.

The embodiments of the invention in which an exclusive property or privilege is claimed are defined as follows:

1. A compact laser construction instrument comprising:

a laser generator including a laser diode that generate coherent light and optic means for forming said light into a first beam of collimated light that is directed along a given axis;

a rotating platform means for supporting said laser generator for rotation of said beam of collimated light in a plane parallel to said given axis and about a rotation axis that is perpendicular to said given axis to thereby generate a plane of light;

an optical means mounted to rotate with said platform, said optical means producing a second beam of coherent collimated light along said rotation axis to thereby generate a narrow beam along the axis of rotation of light that is perpendicular to said plane.

2. The instrument in claim 1 where said element includes another laser generator including another laser diode that is adapted to generating coherent light and optics for forming said coherent light generated by said another laser diode into another beam of collimated light, this is directed to coincide with said rotation axis.

3. The instrument in claim 1 wherein said element includes a partial reflectance light transmission device positioned on said platform at an intersection of said given axis and said rotation axis and adapted to transmit a portion of said first beam of light and to reflect a portion of said first beam along said axis of rotation.

4. The instrument in claim 3 wherein said light transmission device is a first-surface reflecting beam-splitter.

5. A compact laser construction instrument comprising:

a generally planar platform;

a shaft supporting said platform normal to an axis of said shaft;

a motor for rotating said platform about said axis;

a laser mounted on said platform and including a laser diode that generates coherent light and optic means for forming said light into a beam of collimated light that is directed perpendicular said axis;

a partial reflectance light transmission optical element positioned in said beam to transmit a portion of said beam to produce a plane of light that is perpendicular to said axis in response to said motor which rotates said platform and to reflect at least a portion of said beam of light along said axis to thereby produce another beam of light that is aligned with said axis and is rotating in response to said motor which rotates said platform whereby said another beam of light is perpendicular to said plane of light platform;

6. The instrument in claim 5 including a first positioning element for adjustably positioning said laser generator on said platform.

7. The instrument in claim 6 wherein said first positioning element provides one degree of freedom adjustment for said laser generator.

8. The instrument in claim 6 including an elongated crevice on one of said platform and said first positioning element, a bead configured to mateably engage said crevice on the other said platform and said first element and means spaced from said crevice and bead to rotate said first element.

9. The instrument in claim 6 including a second positioning element for adjustably positioning said optical element on said platform.

10. The instrument in claim 9 wherein said second positioning element is supported by said first positioning element.

11. The instrument in claim 10 wherein said second positioning element provides two orthogonal degrees of freedom adjustment of said optical element.

12. The instrument in claim 5 including a positioning element for adjustably positioning said optical element with respect to said platform.

13. The instrument in claim 5 wherein said optical element reflects between approximately 19% and 25% of said beam.

14. The reflective element in claim 5 wherein said optical element is a first-surface reflecting beam-splitter.

15. A compact laser construction instrument comprising:
- a platform assembly including a generally planar platform and a support shaft extended along an axis normal to said platform to rotatably support said platform;
- a motor for rotating said platform about said axis;
- a first laser generator on said platform assembly including a first laser diode that is adapted to generate coherent light and optics for forming said light from said first laser into a first beam of collimated light that is directed perpendicular to said axis and thereby generating a plane of light in response to said motor rotating said platform; and
- a second laser generator on said platform assembly including a second laser diode that is adapted to generate coherent light and optics for forming said light from said second laser into a second beam of collimated light that is directed along said axis, said second beam rotating in response to said motor rotating said platform assembly.

16. The instrument in claim 15 including means defining a cavity in said shaft, wherein said second laser generator is positioned in said shaft cavity.

17. The instrument in claim 16 wherein said first and second laser generators each include a laser diode and a collimating lens.

18. The instrument in claim 15 wherein said first and second laser generators each include a laser diode and a collimating lens.

19. A compact laser construction instrument comprising:
- an enclosure having first and second detached housing portions;
- a shaft mounted along an axis in said first housing portion, said second housing portion supported by said shaft in order to rotate about said axis;
- a motor attached in said first housing portion in order to rotate said second housing portion about said axis;
- means defining an opening in said first housing portion aligned with said shaft;
- a laser generator mounted within said second housing portion and including a laser diode that is adapted to generate coherent light and optics for forming said coherent light into a beam of collimated light that is directed perpendicular said axis, said laser generator positioned to rotate with said second housing portion in order to generate a plane of light; and
- said second housing portion having a skirt portion extending into said opening around said shaft in order to resist the entry of objects into said first housing portion.

20. The instrument in claim 19 wherein said second housing portion further includes an overhang portion extending laterally outwardly of said opening in order to divert objects away form said opening.

21. The instrument in claim 20 wherein said motor is coupled to said skirt portion in order to rotate said light generator.

22. The instrument in claim 21 including means defining an annular channel in said skirt portion and a drive belt extending between said annular channel and said motor.

23. The instrument in claim 19 wherein said motor is coupled to said skirt portion in order to rotate said light generator.

24. The instrument in claim 23 including means defining an annular channel in said skirt portion and a drive belt extending between said annular channel and said motor.

25. The instrument in claim 24 further including a pair of bearings rotatably supporting said shaft and wherein said annular channel is between said bearings.

26. The instrument in claim 19 wherein said laser generator is mounted to a platform that is rotatable with said shaft within said second housing portion by adjustable support means for adjustably supporting said laser generator on said platform.

27. The instrument in claim 26 further including a partial reflectance optical element positioned within said collimated light beam and another adjustable support means for adjustably supporting said optical element on said platform.

28. The instrument in claim 27 wherein said second housing portion includes a removable portion for providing access to said adjustable support means and said another adjustable support means.

29. The instrument in claim 27 wherein said another adjustable support means is supported by said adjustable support means.

* * * * *

UNITED STATES PATENT AND TRADEMARK OFFICE
CERTIFICATE OF CORRECTION

PATENT NO. : 5,287,365

DATED : February 15, 1994

INVENTOR(S) : Edward G. Nielsen, Willard G. Vogelaar and Philip O. Gerard

It is certified that error appears in the above-indentified patent and that said Letters Patent is hereby corrected as shown below:

Column 2, line 19:
   After "diameter" insert --.--.

Column 2, line 21:
   After "intensity" insert --.--.

Column 2, line 34:
   After "crevice" insert --.--.

Column 2, line 48:
   After "portion" insert --.--.

Column 2, line 49:
   After "shaft" insert --.--.

Column 2, line 55:
   After "opening" insert --.--.

Column 3, line 59:
   After "portion 62" insert --.--.

Column 4, line 11:
   After "bracket 94" insert --.--.

Column 4, line 21:
   After "frame 98" insert --.--.

UNITED STATES PATENT AND TRADEMARK OFFICE
CERTIFICATE OF CORRECTION

PATENT NO. : 5,287,365
DATED : February 15, 1994
INVENTOR(S) : Edward G. Nielsen, Willard G. Vogelaar and Philip O. Gerard It is certified that error appears in the above-indentified patent and that said Letters Patent is hereby corrected as shown below:

Column 5, line 37:
  After "surface" insert --.--.

Column 6, line 23:
  "TQLD9410" should be --TOLD9410--.

Column 6, line 33:
  After "housing 26" insert --.--.

Column 8, line 67:
  "of said" should be --for said--.

Column 10, line 16:
  "form" should be --from--.

Signed and Sealed this

Twenty-seventh Day of September, 1994

Attest:

BRUCE LEHMAN

*Attesting Officer*  *Commissioner of Patents and Trademarks*